US008013722B2

(12) United States Patent
Breuer et al.

(10) Patent No.: US 8,013,722 B2
(45) Date of Patent: Sep. 6, 2011

(54) VEHICLE OBSTRUCTION WARNING SYSTEM AND METHOD

(75) Inventors: Karsten Breuer, Lauenau (DE); Thomas Dieckman, Pattensen (DE)

(73) Assignee: WABCO GmbH, Hannover (DE)

( * ) Notice: Subject to any disclaimer, the term of this patent is extended or adjusted under 35 U.S.C. 154(b) by 377 days.

(21) Appl. No.: 12/291,498

(22) Filed: Nov. 10, 2008

(65) Prior Publication Data

US 2009/0121852 A1 May 14, 2009

(30) Foreign Application Priority Data

Nov. 13, 2007 (DE) ......................... 10 2007 053 989

(51) Int. Cl.
*B60Q 1/00* (2006.01)

(52) U.S. Cl. ......................... 340/436; 340/903; 701/301

(58) Field of Classification Search .................. 340/436, 340/435, 903; 701/45, 96, 301
See application file for complete search history.

(56) References Cited

U.S. PATENT DOCUMENTS 5,278,764 A * 1/1994 Iizuka et al. .................. 701/301
5,748,477 A * 5/1998 Katoh ........................... 701/301
6,268,803 B1 * 7/2001 Gunderson et al. ........... 340/903
7,109,854 B2 9/2006 Dobler et al.
7,259,660 B2 * 8/2007 Ewerhart et al. .............. 340/436
2003/0016161 A1 * 1/2003 Okai et al. .................... 701/301
2003/0028291 A1 2/2003 Matsuura
2005/0033516 A1 * 2/2005 Kawasaki ..................... 701/301

FOREIGN PATENT DOCUMENTS

DE 101 28 792 A1 11/2002
DE 10 2005 054 754 A1 5/2007
DE 10 2005 062 151 A1 7/2007
EP 1 475 765 A2 11/2004

* cited by examiner

*Primary Examiner* — John A Tweel, Jr.
(74) *Attorney, Agent, or Firm* — Kramer Levin Naftalis & Frankel LLP

(57) ABSTRACT

A system and method for warning vehicle operators of obstructions are provided. First clearance data of the vehicle, including vehicle height and width, are obtained and stored in memory. An obstruction in the vehicle's path and the travel surface between the vehicle and the obstruction are scanned by a sensor device. Second clearance data of the obstruction, including the height and width of the vehicle passage defined by the obstruction, are determined and are stored in memory. Utilizing a comparison/warning signal generating device, the first and second clearance data are compared, and a warning signal is generated when values of the first clearance data are equal to or greater than corresponding values of the second clearance data. A monitoring device monitors the time period between generation of the warning signal and responsive action by the vehicle operator to avoid a collision. The vehicle is automatically brought to a stop if, upon expiration of a preselected time limit, the vehicle operator has not taken appropriate action.

19 Claims, 1 Drawing Sheet

VEHICLE OBSTRUCTION WARNING SYSTEM AND METHOD

FIELD OF THE INVENTION

The present invention relates to a system and method for warning vehicle operators of obstructions that present insufficient clearance height and/or width.

BACKGROUND OF THE INVENTION

When vehicles such as, for example, trucks and buses, must pass under or through (as the case may be) unfamiliar overpasses, bridges, tunnels, or the like, it is often very difficult for the driver to gauge whether the clearance height and/or the clearance width is sufficient to accommodate the vehicle. It is particularly difficult when the overpass, bridge, tunnel, etc. is inadequately signed, or when uneven road conditions affect clearance. The problems are particularly severe during night travel.

Accordingly, there is a need for a system and method which provide the vehicle operator with timely warning of insufficient vehicle passage clearance (height and width) and, when necessary, automatically stops the vehicle (e.g., by initiating vehicle braking) if appropriate action is not taken in response to the warning.

SUMMARY OF THE INVENTION

Generally speaking, in accordance with the present invention, a new obstruction warning system and method for a vehicle are provided which satisfy the above-identified need.

In accordance with a preferred embodiment of the inventive system and method, first clearance data of the vehicle, including vehicle height and width, are obtained and stored in memory. An obstruction presented in the path of the vehicle and the travel surface between the vehicle and the obstruction are scanned by a sensor device. Second clearance data of the obstruction, including the height and width of a vehicle passage defined by the obstruction, are determined and are also stored in memory. Utilizing a comparison/warning signal generating device, the first clearance data are compared against the second clearance data, and a warning signal is generated when values of the first clearance data are equal to or greater than corresponding values of the second clearance data.

In accordance with another embodiment of the inventive system and method, a monitoring device is employed to monitor the time period between generation of the warning signal and responsive action by the vehicle operator to avoid a collision with the obstruction. The vehicle is automatically brought to a stop if, upon expiration of a preselected time limit, the vehicle operator has not taken appropriate action.

Accordingly, it is an object of the present invention to provide a system and method for warning a vehicle operator of obstructions that present insufficient vehicle clearance (height and width), in sufficient time to avoid vehicle damage and occupant injury.

It is a further object of the present invention to provide a vehicle obstruction warning system and method that automatically brings the vehicle to a stop if appropriate action is not taken by the vehicle operator in response to an obstruction warning.

Still other objects and advantages of the present invention will in part be obvious and will in part be apparent from the specification.

The present invention accordingly comprises the several steps and the relation of one or more of such steps with respect to each of the others, and embodies features of construction, combinations of elements, and arrangements of parts which are adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawing in which.

DETAILED DESCRIPTION OF THE PREFERRED EMBODIMENTS

Figure 1:
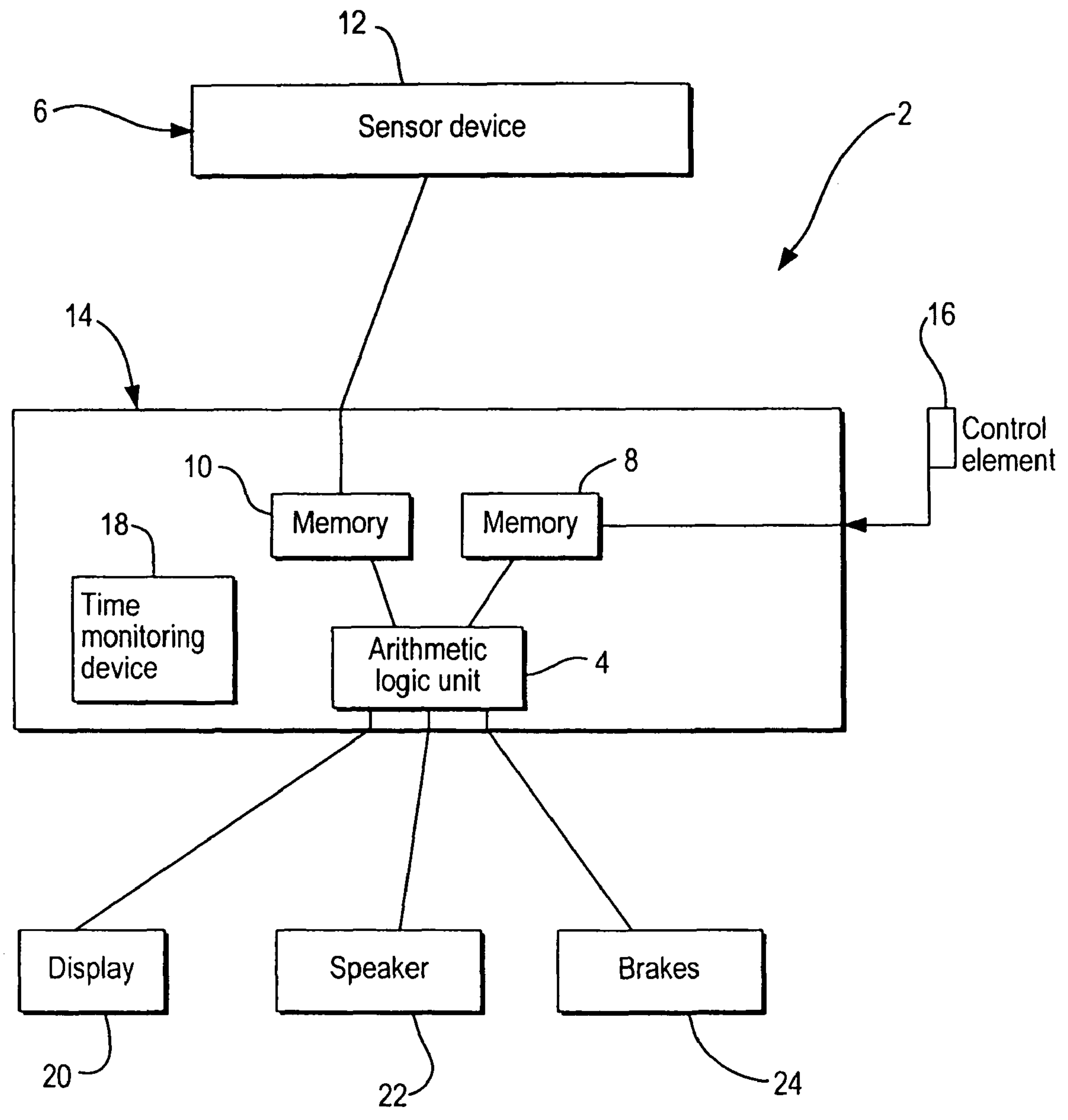
FIG. 1 is a schematic depiction of a vehicle obstruction warning system according to a preferred embodiment of the present invention.

Referring to FIG. 1, a vehicle warning system 2 is provided which includes a device 4 for generating comparison and warning signals and a sensor device 6. Device 4, which can be an arithmetic logic unit of a microprocessor, is in communication with a first memory 8 storing clearance data or parameters of the vehicle (e.g., vehicle dimension information), and with a second memory 10 storing clearance data of obstructions (e.g., dimension information of vehicle passages defined by the obstructions).

Sensor device 6 (e.g., radar-, lidar- and/or camera- (for example, a CMOS camera) based) can scan and record clearance data of obstructions in the path of the vehicle. These data can be input into second memory 10.

In device 4, the clearance data from the first and second memories 8, 10 are compared with one another, and a warning signal for the vehicle operator is generated when the data values from second memory 10, which are associated with an obstruction and can be obtained by sensor device 6, are equal to or smaller than the relevant, corresponding data values from first memory 8, which are associated with the vehicle.

Sensor device 6 includes at least one distance sensor 12, which detects the available travel space between the vehicle and the obstruction. Desirably, the detection geometry is chosen such that both the obstruction as well as the surface on which the vehicle is traveling (e.g., the roadway) are scanned simultaneously. The distance sensor preferably has high angular resolution, so that it can scan the contours of vertical portions of the obstruction accurately.

It should be understood that one or more distance sensors associated with other systems of the vehicle, such as, for example, an adaptive cruise control system (which can, for example, be radar-based or infrared-based), or an autonomous emergency braking system such as, for example, the OnGuardMax™ system of WABCO, can be utilized in the inventive system.

Angle and distance information obtained by sensor device 6 are fed to an analyzer device 14 (which is preferably an electronic control unit—for example, of the vehicle brake system) for analysis and calculation of clearance height and width of the obstruction. The connection with the electronic control unit can be made directly or via a data bus.

A control element 16 (input device, e.g., potentiometer), by means of which the vehicle operator can input relevant clearance data of his/her vehicle into first memory 10, is preferably provided in the vehicle. Alternatively, the relevant clearance data of the vehicle can be parameterized in the system 2.

In the event an obstruction is detected that presents insufficient vehicle clearance (height and/or width), device 4 for generating warning signals generates timely optical, acoustic and/or haptic warning signals for the vehicle operator. The optical warning signal can appear on an optical display 20. The acoustic warning signal can be output via a speaker 22. The haptic warning signal can be realized, for example, by brief applications of a vehicle brake 24.

System 2 preferably also includes a time monitoring device 18 for monitoring the time between generation of the warning signal and action taken by the vehicle operator in response to the warning signal to avoid collision with the obstruction. When a preselected time period has elapsed without appropriate action taken by the vehicle operator to avoid collision, the device automatically brings the vehicle to a stop, e.g., by automatically initiating braking of the vehicle.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A vehicle obstruction warning method, comprising the steps of:

obtaining first clearance data of said vehicle, said first clearance data including height and width of said vehicle;

scanning at least one obstruction presented in a path of said vehicle and a travel surface between said vehicle and said at least one obstruction;

determining second clearance data of said at least one obstruction, said second clearance data including at least one of height and width of a vehicle passage defined by said at least one obstruction;

comparing said first clearance data against said second clearance data;

generating a warning signal when values of said first clearance data are at least one of equal to and greater than corresponding values of said second clearance data, wherein said warning signal is at least one of an optical, acoustic, and haptic signal;

providing a time limit for a vehicle operator to take action responsive to said warning signal to avoid collision with said at least one obstruction; and automatically braking said vehicle to a stop on expiration of said time limit when said operator does not take said action.

2. The method according to claim 1, wherein said scanning step includes scanning said at least one obstruction and said travel surface simultaneously and obtaining angle and distance information associated with said at least one obstruction.

3. The method according to claim 2, wherein said step of determining second clearance data includes calculating said at least one of height and width of said vehicle passage defined by said at least one obstruction based on said angle and said distance information.

4. The method according to claim 3, wherein said step of comparing said first clearance data against said second clearance data is effected in a comparison/warning signal generating device of said vehicle.

5. The method according to claim 1, wherein said first clearance data are stored in a memory associated with a comparison/warning signal generating device of said vehicle.

6. The method according to claim 5, wherein said first clearance data are at least one of (i) input into said memory by an operator of said vehicle prior to commencing a trip in said vehicle and (ii) pre-stored in said memory.

7. The method according to claim 5, wherein said step of comparing said first clearance data against said second clearance data is effected by said comparison/warning signal generating device.

8. The method according to claim 1, wherein said vehicle includes brakes, and said haptic signal includes brief applications of said brakes.

9. A vehicle obstruction warning system, comprising:

a sensor device;

a first memory for storing first clearance data of said vehicle including height and width of said vehicle;

a second memory for storing second clearance data of at least one obstruction presented in a path of said vehicle including at least one of height and width of a vehicle passage defined by said at least one obstruction;

a comparison/warning signal generating device in communication with said first memory and said second memory, said sensor device operative to:

obtain said second clearance data;

compare said first clearance data against said second clearance data; and initiate a warning signal when values of said first clearance data are at least one of equal to and greater than corresponding values of said second clearance data, wherein said warning signal is at least one of an optical, acoustic, and haptic warning signal; and a monitoring device operative to:

monitor a time period between generation of said warning signal and a responsive action by a vehicle operator to avoid collision with said at least one obstruction; and initiate automatic braking of said vehicle to a stop on expiration of a preselected time limit when said operator does not take said responsive action.

10. The system according to claim 9, wherein said sensor device includes at least one distance sensor having high angular resolution adapted to simultaneously scan said at least one obstruction and a travel surface of said vehicle.

11. The system according to claim 10, further comprising an analyzer device constructed and arranged to receive angle and distance information obtained by said sensor device and to calculate said at least one of height and width of said vehicle passage defined by said at least one obstruction based on said angle and distance information.

12. The system according to claim 10, wherein said at least one distance sensor is associated with a different operator assistance system of said vehicle.

13. The system according to claim 12, wherein said different operator assistance system is an adaptive cruise control system.

14. The system according to claim 9, further comprising a control element for enabling input of said first clearance data into said first memory.

15. The system according to claim 14, wherein said first clearance data are input into said first memory using said control element by an operator of said vehicle prior to commencing a trip in said vehicle.

16. The system according to claim 9, wherein said first clearance data are parameterized.

17. The system according to claim 9, further comprising at least one optical display device for displaying said optical warning signals.

18. The system according to claim 9, further comprising at least one speaker for acoustic output of said acoustic warning signals.

19. The system according to claim 9, wherein said vehicle includes brakes, and said haptic signals include brief applications of said brakes.

* * * * *